(12) United States Patent
Mallen et al.

(10) Patent No.: US 6,346,596 B1
(45) Date of Patent: Feb. 12, 2002

(54) GAS BARRIER POLYMER COMPOSITION

(75) Inventors: Thomas R. Mallen, Zelienople, PA (US); Thomas A. Stevenson, Midland, GA (US)

(73) Assignee: Valspar Corporation, Minneapolis, MN (US)

( * ) Notice: Subject to any disclaimer, the term of this patent is extended or adjusted under 35 U.S.C. 154(b) by 0 days.

(21) Appl. No.: 09/616,780

(22) Filed: Jul. 14, 2000

(51) Int. Cl.⁷ .................. C08G 63/00; B05D 5/10
(52) U.S. Cl. .............. 528/176; 528/179; 528/190; 528/193; 528/194; 528/211; 528/219; 528/274; 528/302; 528/361; 528/365; 524/186; 524/366; 524/379; 427/207.1; 428/480; 264/239; 264/331.11
(58) Field of Search ................. 528/274, 302, 528/176, 179, 190, 193, 194, 211, 219, 361, 365; 524/186, 366, 379; 427/207.1; 428/480; 264/239, 331.11

(56) References Cited

U.S. PATENT DOCUMENTS

| | | | |
|---|---|---|---|
| 3,317,471 A | 5/1967 | Johnson et al. | |
| 4,528,235 A | 7/1985 | Sacks et al. | |
| 4,534,995 A | 8/1985 | Pocock et al. | |
| 4,536,425 A | 8/1985 | Hekal | |
| 4,818,782 A | 4/1989 | Bissot | |
| 4,983,432 A | 1/1991 | Bissot | |
| 5,275,853 A | 1/1994 | Silvis et al. | |
| 5,496,910 A | 3/1996 | Mang et al. | |
| 5,700,560 A | 12/1997 | Kotani et al. | |
| 5,707,691 A | 1/1998 | Plester et al. | |
| 5,780,582 A | 7/1998 | Wang et al. | |
| 5,840,825 A | 11/1998 | Carlblom et al. | |
| 5,852,163 A | 12/1998 | Chen et al. | |

FOREIGN PATENT DOCUMENTS

| | | |
|---|---|---|
| WO | WO 97/47695 | 12/1997 |
| WO | WO 98/24839 | 6/1998 |

OTHER PUBLICATIONS

Brennen et al., *Macromolecules*, 1996, 29(11):3707–3716.
Brennen et al., *Macromolecules*, 1998, 31(8):2622–2630.
Kobler et al., NOVA–PAC Jan. 27, 1998, "New Technology for Recycling Barrier Coated PET Bottles," pp. 3–9.
Schotland Business Research, Inc., "World's First Commercial Barrier Coated PET Beer Bottle to be Highlighted at Nova–Pack," 3 pp.

*Primary Examiner*—Samuel A. Acquah
(74) *Attorney, Agent, or Firm*—Fish & Richardson, P.C., P.A.

(57) ABSTRACT

A gas barrier polymer composition with active hydrogen functionality is provided. The polymer may be prepared by reacting a solution of organic diacid containing at least one active hydrogen group and diglycidyl ether in the presence of an optional catalyst. The pressure, temperature, and time parameters of the reaction are preferably regulated to prevent degradation and subsequent incorporation of degradation products of organic diacid containing at least one active hydrogen group into the gas barrier polymer composition. A formulation of the gas barrier polymer composition and a carrier may be used to coat plastic materials, containers, and preforms. The gas barrier polymer composition may also be employed in a method of making multilayer packaging materials or container preforms. The multilayer packaging materials or preforms can be used to make containers useful in packaging gas sensitive substances.

24 Claims, No Drawings

GAS BARRIER POLYMER COMPOSITION

FIELD

The present invention relates to gas barrier polymer compositions and methods of making and using same.

BACKGROUND

Plastics are finding increasing use as replacements for glass and metal containers in packaging. This trend can be attributed in part to the advantages presented by plastic packaging, including lighter weight, decreased breakage, and potentially lower costs. However, the use of plastics in the packaging industry presents some drawbacks. One drawback is that packaging plastics have relatively low gas barrier capabilities. Oxygen or carbon dioxide can readily pass through most of the plastic materials traditionally used in the packaging industry, including polycarbonates, polyesters, and polyolefins. Oxygen-sensitive substances, such as foods, beverages, medicines, or medical supplies, may be susceptible to oxidative degradation if packaged in these plastic materials. One goal of the plastic packaging industry has thus been to greatly reduce the gas permeability of packaging materials.

Another drawback associated with the use of plastics in the packaging industry is that widespread commercial acceptance of plastic in the bottling industry, particularly polyethylene terephthalate (PET), has created a significant environmental problem. PET bottles are typically not reused and accumulate in waste disposal facilities, because PET is very stable and not susceptible to biodegradation. Thus, another goal of the packaging industry has been the development of PET recycling methods.

Research in the packaging industry focuses on designing packaging materials with enhanced gas barrier properties that maintain the favorable cost and processing characteristics of PET and additionally, that can be recycled. Efforts to develop plastic packaging materials with improved gas barrier properties and favorable recyclability characteristics have been based on several general strategies.

A first general strategy involves developing new polymer blends, or modifying the chemical or physical properties of "parent" packaging materials, such as PET, polyethylene, polycarbonate, or polyester. For example, one gas-scavenging packaging material is made from a polyethylene graft copolymer and a polyamide. Another gas-scavenging packaging material is made from a blend of an aromatic condensation polymer (such as polyester or polycarbonate) and an oxygen scavenging polymer (such as nylon), in the presence of a trace amount of a transition metal catalyst like cobalt. A similar gas barrier polymer packaging material incorporates activating metals such as cobalt, magnesium, or manganese in a PET/polyamide admixture. Preparation of gas barrier packaging materials of this type involves heating a mixture of the polymer materials and the metal to produce an injection molded preform. A container with enhanced gas barrier properties is then fashioned from the preform. In each of the above examples, improved gas barrier properties are observed. However, activating metal incorporation in the packaging material formulations raises the issue of activating metal recapture at the recycling stage.

A second general strategy for improving gas barrier properties follows a multilayer packaging scheme. A gas barrier polymer composition is applied to a plastic packaging material that has limited gas resistance. In one approach, inner and outer layers of PET are used to surround a core layer of oxygen scavenging ethylene vinyl alcohol or polyketone. In a second approach, PET is coated with an aminoepoxy barrier coating material. In this second approach, the aminoepoxy barrier coating material may contain an inorganic filler; or alternatively, a polyvinyl alcohol or polysaccharide gas barrier film may contain the inorganic filler. The fillers retard gas permeation by blocking the pores of the film through which gas molecules would normally migrate.

Barrier coatings derived from 1,1-dichloroethene or ethylene vinyl alcohol have some disadvantages as well. For instance, they lose barrier properties upon exposure to water. In addition, packages made incorporating these materials do not stand up to the conditions required for pasteurization (heating under pressurized steam) and lose their adhesion properties. Disposal or recycling of the packages also poses environmental concerns, because of the presence of chloride atoms in the coating materials made from, for example, 1,1-dichloroethene.

In a hybrid strategy that combines aspects of each of the above-mentioned approaches, hydroxyfunctional polyesters serve either as PET substitutes or as barrier films. These polyesters have moieties derived from hydroxy functional aliphatic diacids and diglycidyl ethers or diglycidyl esters. The polyesters have gas resistance capabilities and are uncrosslinked. They are processable as thermoplastics useful for making films or molded or formed articles employing conventional injection molding techniques. However, the promise of substantial gas barrier properties has not proved out in practice for the hydroxy functional polyesters. The known hydroxyfunctional polyesters do not show superior barrier properties.

As a result, there remains a need in the packaging industry for the development of effective gas barrier polymer compositions. In particular, there remains a need to develop gas barrier polymer compositions from hydroxy functional aliphatic diacids and diglycidyl ethers with effective gas barrier properties. A further need is to develop polymers that have gas resistance qualities, and are processable and recyclable.

SUMMARY

These and other needs are met by the present invention, which is directed to gas barrier polymer compositions having high active hydrogen group densities. In a preferred embodiment, the invention is directed to active hydrogen containing polyesters that are substantially free of the degradation products derived from organic diacids containing active hydrogen groups.

In one aspect, the invention is directed to gas barrier polymer compositions that are the reaction product of diglycidyl ethers and organic diacids containing active hydrogen groups, and that are at least substantially free of degradation product polyesters. A preferred gas barrier polymer composition of the present invention is the polyester product of an active hydrogen containing organic diacid and a diglycidyl ether, which product is substantially free of moieties derived from the degradation of the active hydrogen containing organic diacid.

In another aspect, the invention is directed to a process for preparing gas barrier polymer compositions by combining organic diacids containing active hydrogen groups and diglycidyl ethers in the presence of an optional catalyst; wherein the pressure, temperature, time, and solvent parameters of the process are regulated to prevent degradation and subsequent incorporation of degradation products of organic diacids containing active hydrogen groups into the gas barrier polymer compositions.

In another aspect, the invention is directed to a coating formulation of the gas barrier polymer composition and a suitable carrier.

In a further aspect, the invention is directed to a method of making multilayer packaging materials or container preforms of at least one layer of a polymeric gas-permeable material and at least one layer of a gas barrier polymer composition of the invention.

In still another aspect, the invention is directed to a polymeric container useful in packaging oxygen sensitive substances, the container having at least one layer of a polymeric gas barrier material that contains a gas barrier polymer composition of the invention.

DEFINITIONS

The terms used in this specification have the meanings and preferred embodiments as provided unless otherwise specified.

The term "active hydrogen group" means a moiety that has labile hydrogen. Moieties known in the art that have labile hydrogen include, but are not limited to hydroxyl moieties, as well as primary and secondary amino moieties and thiol moieties.

The term "degradation product polyester" means a polyester obtained from the degradation products of an organic diacid containing one or more active hydrogen groups.

The phrase "substantially free of degradation product polyesters" means that the gas barrier polymer compositions of the present invention are contaminated with no more than about thirty (30) weight percent of polymers derived at least in part from the degradation products of an organic diacid containing one or more active hydrogen groups.

The phrase "essentially free of degradation product polyesters" means that the gas barrier polymer compositions of the present invention are contaminated with no more than about ten (10) weight percent of polymers derived at least in part from the degradation products of an organic diacid containing one or more active hydrogen groups.

The phrase "essentially completely free of degradation product polyesters" means that the gas barrier polymer compositions of the present invention are contaminated with no more than about one (1) weight percent of polymers derived at least in part from the degradation products of an organic diacid containing one or more active hydrogen groups.

In connection with the gas barrier polymer composition of the present invention, the term "polyhydroxy functionality" means that one or more, and preferably more, hydroxy groups are appended to the carbon atoms that form the backbone of the gas barrier polymer composition.

"Gas permeable," as applied to containers made from plastic packaging materials refers to the characteristic of the packaging material that allows migration of gases such as oxygen and carbon dioxide through the material. The gas permeability of the barrier material is determined by its chemical composition as well as its physical characteristics such as, but not limited to, the thickness of the material as applied on a plastic container. The oxygen permeability of plastic materials is measured in the art by the oxygen permeability constant, or OPC. Expressed in units of cubic centimeter-millimeter/650 square centimeters/atmosphere/day, the OPC quantifies the amount of oxygen that can pass through a film or coating. Specifically, the OPC measures the cubic centimeters of oxygen that have passed through a sample, one millimeter in thickness, and 650 square centimeters in area, over a 24 hour period at 25° C., one atmosphere of pressure, and 50% relative humidity. A "high" OPC indicates that a plastic material has relatively low gas barrier properties. Conversely, a "low" OPC indicates that a plastic material has relatively high gas barrier properties. As an example, poly (ethylene teraphthalate) ("PET"), a plastic used commonly in the food and beverage industry, has a relatively high OPC value of about 6 for oxygen.

The carbon dioxide permeability constant, or $CO_2PC$, expressed in units of cubic centimeter-millimeter/650 square centimeters/atmosphere/day, quantifies the amount of carbon dioxide that can pass through a film or coating. Specifically, the $CO_2PC$ measures the cubic centimeters of carbon dioxide that have passed through a sample, one millimeter in thickness, and 650 square centimeters in area, over a 24 hour period at 25° C., one atmosphere of pressure, and 50% relative humidity. As an example, poly (ethylene teraphthalate) ("PET") has a relatively high $CO_2PC$ value of about 19 for carbon dioxide.

"Barrier material" means a plastic packaging or coating material that has a low OPC value relative to conventional packaging materials such as PET. Preferred barrier materials exhibit high resistance to migration through the material of gases such as oxygen or carbon dioxide, and thus have low gas permeabilities.

DETAILED DESCRIPTION

The present invention relates to gas barrier polymer compositions that are polyesters that are prepared from diglycidyl ethers and organic diacids containing at least one active hydrogen group. The gas barrier compositions are preferably at least substantially free of degradation product polyesters. The invention also relates to a process for preparing such gas barrier polymer compositions. The invention further relates to coating formulations of the gas barrier polymer composition and a carrier. The invention also further relates to a method for making multilayer packaging materials, preforms, and containers that include at least one layer of a gas barrier polymer composition.

Suitable gas barrier polymer compositions of the present invention include polyesters, as depicted generally in Formula 1;

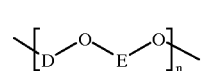

wherein D is the residue of an organic diacid containing at least one active hydrogen group, and E is the residue of a diglycidyl ether. More specifically, suitable gas barrier polymers of the present invention include polymers represented by Formula 2;

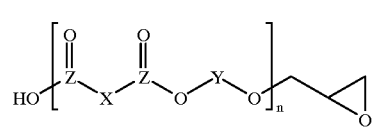

wherein X is a divalent moiety, as depicted, for example, in Formula 3;

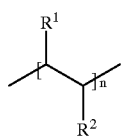

in which n=1 to about 10 and at least one of the $R^1$ and $R^2$ groups is an active hydrogen group. The other group may be hydrogen, alkyl, cycloalky, aryl, arylalkyl, alkenyl, or cycloalkenyl;

Y is an aromatic moiety as depicted, for example, in Formula 4:

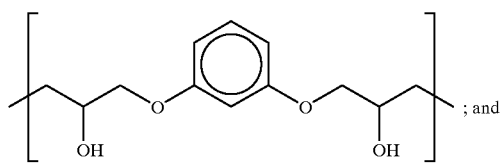
; and

Z is carbon (C), phosphorous (P), sulfur (S), or Selenium, so that Z=O may be C=O; P=O, or variants in higher oxidation states; S=O, or variants in higher oxidation states; or Se=O, or variants in higher oxidation states.

Suitable divalent moieties (X), e.g., as depicted in Formula 3, contain aliphatic linkages, aromatic linkages, or mixtures thereof, of between two (2) carbons and twenty (20) carbons, and in which at least one, and preferably both, of $R^1$ or $R^2$ are active hydrogen groups such as —OH, —SH, —$NHR^3$, wherein $R^3$ may be a group such as hydrogen, alkyl, cycloalkyl, aryl, arylalkyl, alkenyl, or cycloalkenyl.

Preferred aromatic moieties (Y), e.g., as depicted in Formula 3, are derived from diglycidyl ethers. Such derivatives of diglycidyl ethers preferably contain a group having one or more aromatic or heteroarmatic rings and may contain one or more substituent groups bonded to the aromatic ring. Suitable substituent groups include alkyl, cycloalkyl, alkoxy, aryloxy, amido, halo, nitro, cyano, carboxyl, carbonyl, or sulfoxyl groups.

The present invention preferably provides gas barrier polymer materials that are substantially free of moieties derived from degradation product polyesters and yet that exhibit a high degree of active hydrogen functionality. A high degree of active hydrogen functionality is a desired feature of the gas barrier polymer compositions. This feature translates into the physical characteristic of gas permeation resistance at minimal material thickness. Minimal material thickness translates into lower cost, easy application, and efficient processing for packagers.

Polymers that are substantially free of active hydrogen containing organic diacid degradation products are preferred because of their active hydrogen group density, gas resistance qualities, processability characteristics, smooth, glossy appearance, and recyclability. Preferred processes for synthesizing the preferred gas barrier polymer compositions of the present invention substantially avoid these degradation products.

In one embodiment, suitable gas barrier polymer compositions of the present invention may be formed by condensation polymerization of a diglycidyl ether and an organic diacid containing at least one active hydrogen group. While not intending to be bound by theory, the hydroxy groups that are produced upon epoxide ring opening, along with the active hydrogen groups of the parent organic diacid containing at least one active hydrogen group, are believed to impart the desired gas barrier properties to the gas barrier polymer composition.

It was discovered that organic diacids containing active hydrogen groups have limited solubility in the solvent systems of choice, even at temperatures higher than ambient (ie., 25° C. or higher). It was also discovered that in these systems, the organic diacid containing at least one active hydrogen group becomes susceptible to degradation. The rate-determining step of the condensation polymerization was discovered not to be the nucleophilic attack of carboxylate on the diglycidyl ether and subsequent epoxide ring opening. Rather, the rate-determining step of the reaction was discovered to be solvation of organic diacid containing at least one active hydrogen group.

Although not intended as a limitation of the present invention, it is believed that the poor properties of the early experiment product polyesters discussed above result from degradation of unsolvated organic diacid containing at least one active hydrogen group. Unsolvated tartaric acid, for example, is believed to be susceptible to degradative decarboxylation at elevated temperatures. Decarboxylation of tartaric acid gives rise to degradation products such as 2,3-oxopropanoic acid, hydroxy malonic acid, glyoxylic acid, and pyruvic acid. These degradation products (or subsequent degradation products of the primary degradation products) are believed to become solvated and are believed to undergo reaction with diglycidyl ether. The result is the formation of undesired polyesters incorporating these diacid degradation products, along with the desired product. The resulting polyester compositions have lower molecular weight, lower active hydrogen group density, unsatisfactory barrier properties, and other unfavorable processability, appearance, and recyclability characteristics compared with known gas impervious materials. Preferred gas barrier polymer compositions of the present invention are believed to have a lower amount of such undesired polyesters.

The gas barrier polymer compositions of the present invention have high active hydrogen group densities and weight average molecular weights in the range of from about 2,000 to 80,000. Preferred gas polymers have a molecular weight in the range of from about 3,000 to about 30,000. More preferred gas polymers have a molecular weight in the range of from about 4,000 to about 25,000. Most preferred gas polymers have a molecular weight in the range of from about 5,000 to about 20,000. A preferred gas barrier polymer composition occurs as an admixture of at least a "substantial amount" of the gas barrier polymer of Formula 2 and the polymers derived at least in part from the degradation products of organic diacid containing at least one active hydrogen group. "Substantial amount" means the gas barrier polymer of Formula 2 is present as equal to or more than 70 percent of the product admixture.

Preferred gas polymers have a negligible acid value, and are stable at temperatures ranging from about 35 to about 160° C. "Stable" means that the gas barrier polymers do not undergo substantial irreversible change in viscosity when stored in this temperature range for a period of up to six months.

A more preferred gas barrier polymer composition is essentially free of degradation product polyesters. A most preferred gas barrier polymer composition is essentially completely free of degradation product polyesters.

Preferably, the gas barrier polymer composition of the invention has an OPC and a $CO_2PC$ less than that of a typical PET composition. More preferably, the gas barrier polymer composition of the present invention has an OPC for oxygen of not more than about 5, most preferably not more than about 1 and optimally not more than about 0.05. More preferably, the gas barrier composition of the present invention has a $CO_2PC$ for carbon dioxide of not more than about 10, most preferably not more than about 2, and optimally not more than about 0.3.

A suitable process for preparing the gas barrier polymer compositions of the present invention involves contacting organic diacids and diglycidyl ethers in the presence of an optional catalyst. Suitable organic diacids include linear or branched compounds represented by general Formula 5:

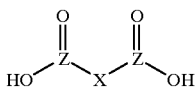

5 where
- X is preferably the divalent moiety of Formula 3 and preferably contains aliphatic linkages, aromatic linkages, or mixtures thereof, of between two (2) carbons and twenty (20) carbons, and in which at least one, and preferably both of $R^1$ or $R^2$ are active hydrogen groups, derived from nitrogen, oxygen, or sulfur, such as amino, hydroxy, or mercapto, and preferably hydroxy; and
- Z is carbon (C), phosphorous (P), sulfur (S), or Selenium, so that Z=O may be C=O; P=O, or variants in higher oxidation states; S=O, or variants in higher oxidation states; or Se=O, or variants in higher oxidation states. Suitable diacids include diacids of sugars, cycloalkyl dioic acids (e.g., 2,3-cyclohexyl diacid, 2,5-cyclohexyl diacid, 2,6-cyclohexyl diacid), alkane dioic acids, alkene dioic acids, and aryl dioic acids. Suitable organic diacids for the present invention include tartaric, malic, citramalic, and hydroxy glutamic acid. Tartaric acid is most preferred because of its high density of active hydrogen groups per unit weight and its low cost.

Diglycidyl ethers suitable for the present invention include compounds represented by general Formula 6:

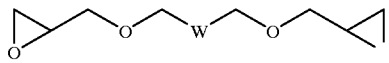

6 wherein W is a divalent linking group (e.g., an aromatic moiety or hydrocarbylene. Suitable diglycidyl ethers used for the preparation of the gas barrier polymer compositions include diglycidyl ethers of phenols. Preferred diglycidyl ethers of the present invention are those possessing "meta," or "1,3"-substitution of the phenolic ether moieties. Meta-substituted diglycidyl ethers (e.g., resorcinol diglycidyl ether) have a linear, as opposed to a bent, structural orientation. The linear orientation of the gas barrier polymer compositions derived from meta-substituted diglycidyl ethers is believed to lend itself to the observed gas barrier properties. Resorcinol diglycidyl ether is preferred because of its favorable reaction profile and properties as a thermoplastic component. Suitable phenols for practicing the present invention include, but are not limited, to 9,9-bis(4-hydroxyphenyl)fluorene, hydroquinone, resorcinol, 4,4'-sulfonyldiphenol, 4,4'-thiodiphenol, 4,4'-oxydiphenol, 4,4'-dihydroxybenzophenone, 4,4'-biphenol, bis(4-hydroxyphenyl)-methane, 2,6-dihydroxynaphthalene and 4,4'-isopropylidene bisphenol (bisphenol A).

The present invention preferably employs a suitable catalyst. One suitable catalyst, a tertiary amine, may be used to catalyze the condensation polymerization between the organic diacid, e.g., as depicted in Formula 5, with a diglycidy ether, e.g., as depicted in Formula 6, to give rise to a gas barrier polymer composition, e.g., as depicted in Formula 2.

One preferred embodiment of the present invention employs a non-aniline derived tertiary amine catalyst. Suitable catalysts include, but are not limited to methyl diethylamine, triethyl amine, dimethyl propyl amine, methyl dipropylamine, tripropyl amine, methyl diisopropyl amine, methyl dibutyl amine, ethyl dibutyl amine, tributyl amine, N,N dimethyl benzyl amine, and N,N diethyl benzyl amine.

Suitable molar equivalents in which the reaction mixture components may be employed are: organic diacid containing an active hydrogen groups (1 equivalent); diglycidyl ether (1 to 5 equivalents); and catalyst (0.01 to 0.10 equivalents) wherein equivalents are based upon the carboxylic acid group-epoxide reaction. A suitable concentration in inert solvent for the condensation polymerization is generally between about 0.5 to about 5.0 molar based on the equivalents of organic diacid containing an active hydrogen groups used. Preferred concentration is between 1 and 4, and more preferably between 1.5 and 3.5 molar.

The pressure, temperature, and time parameters for the condensation polymerization of the present invention are preferably regulated to prevent degradation, and/or subsequent incorporation of degradation product polyester into the gas barrier polymer composition. The reaction is preferably conducted under a non-oxidizing atmosphere such as a blanket of nitrogen or other inert gases to prevent oxidative decarboxylation and other undesired processes. If desired, a relatively low boiling polar aprotic inert solvent may be used. Preferred solvents include polar aprotic solvents such as aliphatic ketones and alicyclic ethers. The most preferred solvents are acetone and methyl ethyl ketone. It is believed that the use of an inert gas and the polar aprotic solvent in part helps to prevent diacid degradation.

Suitable reaction temperatures for synthesizing the gas barrier polymer composition are typically less than the functional temperature at which the organic diacid containing at least one active hydrogen group begins to decompose at standard temperature and pressure. Usually, this temperature is less than 100° C. It is believed that this temperature control in part helps to prevent degradation of the organic diacid containing an active hydrogen group. The preferred temperature range is from about 25 to about 99° C.

Suitable reaction pressures are typically in the range of 1 to 3 atmospheres and are preferably chosen to minimize the reaction temperature. It is believed that control of the reaction pressure in tandem with control of reaction temperature helps in part to minimize diacid degradation. Thus, reaction pressures that approach I atm. are preferably matched with reaction temperatures that approach about 50 to about 60° C. Likewise, reaction pressures that approach 2 atm. are preferably matched with reaction temperatures that are typically in the range of about 90° C. Reaction pressures that approach 3 atm. are preferably matched with reaction temperatures that are typically in the range of about 120° C. Reaction times are chosen to maximize acid-diglycidyl ether condensation polymerization, and to minimize gelation due to over-condensation and crosslinking. Typically reaction times are less than about 10 hours. Preferably, they are less than about 8 hours. More preferably, they are between about 4 and 8 hours.

Control of reaction conditions preferably additionally minimizes crosslinking and gelation of the gas barrier polymer composition. Gelation of the gas barrier polymer composition gives rise to an intractable material, unusable for packaging applications. Control of reaction conditions also helps to alleviate potentially undesirable ring opening from the "interior" carbons of the diglycidyl ethers. Epoxide ring opening from the interior carbons gives rise to hydroxymethyl-substituted polyesters. Since hydroxymethyl groups (or "primary" hydroxyl groups) are sterically less hindered than secondary hydroxyl groups, they are thought to be more prone to undergo crosslinking. As indicated, crosslinking of the gas barrier polymer composition is undesired and gives rise to a gelled, highly viscous, and unusable material.

In one embodiment of the present invention, an acetone solution of tartaric acid and resorcinol diglycidyl ether undergo condensation polymerization in the presence of a catalyst to give rise to the gas barrier polymer composition. The pressure, temperature, and time parameters of the reaction are regulated to prevent any undesirable degradation, and subsequent incorporation of undesirable quantities of degradation product polyesters into the gas barrier polymer. The presently most advantageous pressure employed to form the gas barrier polymer composition is from greater than about 1 atmosphere to less than about 2 atmospheres. The most advantageous temperature is from about 40 to 100° C. The most advantageous time is from about 5 minutes to about 6 hours.

In an alternative embodiment, the reaction may be conducted at atmospheric pressure in a suitable solvent such as methyl ethyl ketone. The presently most advantageous temperature is from about 40 to about 100° C. The most advantageous time is from about 3 to about 6 hours.

The gas barrier polymer compositions formed in the above tartaric acid/resorcinol diglycidyl ether embodiments are preferably clear and glossy in appearance. The compositions have an EEW in the range of from about 1,000 to about 7,000, preferably of from about 1,500 to about 5,000, and most preferably about 2,000 to 4,000. They have a bubble tube viscosity of about 0-W adjusted to 50 percent non volatile (NV) with a mixture of 25 parts of water and 25 parts of acetone. The gas barrier polymer compositions preferably have OPC values of about 0.05 for oxygen and about 2.0 for carbon dioxide. They are preferably suitable for recycling.

The gas barrier polymer compositions of the present invention can be applied as a coating formulation onto substrates such as polymeric materials or containers used for packaging. The coating formulation includes the gas barrier polymer composition and a carrier. The coating formulation is prepared by mixing the gas barrier composition in a carrier to form a dispersion or solution, preferably a solution. The carrier is preferably a liquid medium. The preferred carrier allows for easy application of the coating formulation onto substrates, but can be removed as needed under processing conditions. The gas barrier coating formulations may also contain materials such as emulsifiers, surfactants, platelet fillers, and others, depending on the requirements of practitioners.

The gas barrier coating formulations can be applied in a number of ways to polymeric packaging materials such as PET bottles. For instance, conventional methods for applying the gas barrier coating formulations include spraying, rolling, dipping, brushing, and related techniques. In these coating techniques, the gas barrier polymer formulations are dispersed or dissolved in a carrier and may be coated onto plastic "preforms."

A preform is a term used in the art to describe plastic objects that are designed to be blow molded. In this process, plastic objects are injection molded and then blown to form containers or bottles. A typical preform is a hollow piece of plastic that has the desired mass of the bottle that will be formed upon blow molding. Typically, the preform is placed in a mold and heated. Pressurized air is blown into the hollow portion of the object. The object then expands to fit the dimensions of the mold. Dip coating of preforms is preferred because the method uses much less solvent than dip coating or spray coating bottles. Dip coating preforms is also preferred over coating bottles or containers because it is less expensive and more efficient from production and transportation standpoints.

In the dip coating process, a plastic material, container, or preform is dipped into the gas barrier coating formulation. The application viscosity of the coating solution preferably should be greater than that for a free moving material, such as water. This is to ensure that the desired amount of the gas barrier polymer composition is coated onto the plastic material, container, or preform. Yet the application viscosity of the gas barrier coating formulation typically must also be less than that for a syrupy material such as molasses. This is to ensure application ease and speed. Typically the viscosity will range from about 100 to 2000 cps. at 25° C., more preferably from about 200 to 1500 cps. at 25° C., and most preferably from about 300 to 1000 cps. at 25° C. The coated plastic materials, containers, or preforms are then dried, e.g., in an oven. Drying occurs at a functional temperature less than the functional temperature at which the coating degrades, and preferably operates to drive off the carrier solvent.

In an embodiment of the dip coating process, preforms are dipped into the gas barrier polymer coating formulation. Carriers of the present invention include polar solvents and mixtures of polar solvents (e.g., a mixture of water and a polar organic compound). A preferred carrier of the present invention is a mixture of water and an organic solvent (e.g., acetone), in a ratio by volume ranging from about 1:1 to about 1:3. Preferably, the ratio is in the range of from about 1.3:1 to about 1.7:1. Preferred solutions of the gas barrier material have a solid weight percent in the range of from about 15 to about 80 percent, more preferably in the range of from about 25 to about 70 percent, and more preferably in the range of from about 40 to about 60 percent.

Preforms of 20 ounce (600 milliliter) PET bottles are dipcoated in the coating composition of the present invention, giving rise to a coated preform. The gas barrier coating polymer is then dried. The heating temperatures will generally be lower than the temperature at which the gas permeable polymeric material undergoes discoloration, distortion, or degradation. Generally, the coating polymer can be dried by heating at temperatures of from about 35 to about 160° C., preferably from about 70 to about 150° C., and most preferably from about 104 to about 127° C. Drying times depend generally on the viscosity of the coating composition and the rate of removal of the substrate from the dipping bath and are preferably from about 1 minute to about 20 minutes, and more preferably from about 5 minutes to about 15 minutes. This process gives rise to plastic materials, containers, or preforms coated with a layer of the gas barrier polymer composition. The gas barrier coating preferably has an average oxygen permeability constant (OPC) of about 0.015 to 8.0 cc-mil/day/650 $cm^2$/atm and an average carbon dioxide permeability constant ($CO_2$PC) of about 0.10 to 20 cc-mil/day/650 $cm^2$/atm.

The gas barrier coating formulations of the present invention can be used in combination with conventional packaging materials and containers, such as polyolefin, polyethylene, polycarbonate, or polyester. Polymeric materials such as polycarbonates and polyolefins are known to be very gas permeable. Gas permeable polymeric materials generally have limited use as packaging for oxygen sensitive foods, beverages, or medicines. The gas barrier coating formulations of the present invention are therefore especially suited for use in combination with these gas permeable polymeric materials.

As mentioned, coating formulations of the present invention may also include, for example, emulsifiers, surfactants, pigments, platelet fillers, as well as other materials, depending on the end needs and uses that are contemplated by practitioners. The addition of one or more of these materials, or the addition of other materials may be employed to enhance gas barrier properties or other physical or aesthetic properties. For example, adding an inorganic platelet-type filling material to the coating formulation improves the barrier properties of the gas barrier polymer coating.

While not wishing to be bound by any theory, it is generally believed that fillers such as talc, mica, platelet silicas, flaked metal, and flaked glass obstruct the diffusion of gases through permeable resins. The optional filler preferably should have a mean particle diameter ranging from about 0.1 to less than 10 microns, more preferably from about 4 to 9 microns. When used, the optional filler should additionally be present in an amount ranging from about 12 to 50 weight percent, more preferably in an amount ranging from 15 to 40 percent, based upon the total solids weight of the gas barrier polymer composition.

Suitable platelet fillers incorporated here for the present invention have the above-mentioned particle diameters and volumes. The presently most preferred filler for the purposes of this invention is mica due to its commercial availability. Micas useful in packaging this invention include both natural and synthetic micas. Examples of natural micas include biotite $(K^2(Fe^{2+}Mg))_6(Al_2Si_6O_{20})(OH)_4)$, muscovite $(K_2Al_4(Al_2Si_6O_{20})(OH)_4)$, and phlogopite $(K^2(Fe^{2+}Mg))_6(Al_2Si_6O_{20})(OH,F)_4)$. Examples of synthetic micas include barium disilicic $(Ba_2Mg_6Al_2Si_6O_{20}F_4)$ and fluorophlogopite $(K^2(Fe^{2+}Mg))_6(Al_2Si_6O_{20}F_4))$.

Suitable multilayer packaging materials and containers of the present invention include at least one layer of a first polymeric material (typically a gas permeable material) and at least one layer of the gas barrier polymer composition of the present invention applied as a coating formulation. Preferred gas barrier polymer compositions are the reaction products of hydroxyfunctional organic diacid and diglycidyl ether. In the preparation of the packaging material, a layer of the first polymeric material can be coated with a layer of the gas barrier coating formulation, for example, by spraying or dipping. The coating formulation can then be dried at sufficient times at sufficient temperatures. The gas barrier layer may comprise an inner layer or an outer layer or both as desired.

Containers including at least one layer of a first polymeric material (e.g., a gas permeable polymeric material) can be preformed into desired shapes. Afterwards, at least one layer of the gas barrier polymer composition can be applied onto the preformed container in a manner as described for the multilayer packaging materials.

In an alternative embodiment of the present invention, the method for making multilayer containers involves the coinjection of a dried and pelletized gas barrier polymer composition (e.g., a composition that has previously been pelletized) with a first polymer (e.g., a gas permeable polymer such as PET) to form a injection molded preform. In this method, inner and outer streams of materials are combined in a mold cavity to produce an injection molded preform. The outer stream is a thin barrier layer of the gas barrier polymer composition. The inner stream is PET or other material used in the art, such as polyethylene, polycarbonate, or polyester. If desired, the inner and outer stream materials may be swapped and the inner stream may be the barrier layer. In addition, preforms having three or more layers may be utilized with the barrier layer being at least one of the layers. The multilayer preforms can be produced in high volume at the same cycle time as monolayer preforms. Suppliers of the preferred coinjection apparatus include, but are not limited to Kortec, Inc. (Beverly, Mass. USA) or Otto Hofstetter AG (Uznach, Switzerland).

The Kortec apparatus, described in U.S. Pat. No. 5,914,138, the disclosure of which is incorporated here by reference, embraces a method of coextruding multiple plastic materials through a gate region into a mold cavity to produce a molded product. In essence, an "inner" stream of plastic that ultimately will serve as the interior core of the molded plastic (such as PET), is combined with an "outer" stream of plastic (such as the gas barrier polymer composition described herein). The outer stream of the gas barrier polymer composition serves as a covering plastic layer. The resulting multilayer packaging preforms of the present invention have at least one layer of a gas-permeable polymeric material and at least one layer of the gas barrier polymer composition. The preforms are then injection molded to form plastic bottles and containers suitable for packaging food, beverages, medicines, and medical supplies.

The multilayer packing materials and containers of the present invention are ideally suited for packaging of food, beverages, medicines, medical supplies, and related substances. The principal advantage of the packaging materials and containers are their low gas permeability relative to the gas permeability of other plastic packaging materials. The multilayer packaging materials and containers of the present invention preferably do not require the use of adhesives or tie layers between the respective gas permeable polymeric materials and the gas barrier polymer composition, although such layers may be used if desired.

In addition, preferred containers coated with the gas barrier polymer compositions of the present invention are ideally suited for recycling procedures designed for PET or related plastics. Certain preferred gas barrier polymer compositions of the present invention are susceptible to hydrolysis when exposed to alkaline solution. Upon hydrolysis, these coatings readily decompose to hydroxyfunctional organic diacid and hydrolyzed epoxy. These gas barrier coatings may thus be removed from bottles made from PET or other plastics by initially washing the bottles with an aqueous solution of sodium hydroxide, potassium hydroxide, or similar alkaline solution. The washed PET bottles, free of the gas barrier polymer composition coating, can then be recycled according to industry standards. The active hydrogen containing diacid and ether subunits of the gas barrier polymer composition can also be recovered from the base bath and recycled.

While the gas barrier materials of the present invention are described as useful as coatings on a variety of gas permeable polymeric materials, it should be apparent to individuals reading this specification that such gas barrier polymer formulations may be useful in other applications.

EXAMPLES

The present invention is more particularly described in the following examples that are intended for illustration purposes only, since numerous modifications and variations will be apparent to those skilled in the art. Unless otherwise indicated, all parts and percentages are by weight.

Testing Procedures

Measurement of Oxygen and Carbon Dioxide Permeabilities

Oxygen permeabilities, i.e., oxygen gas transmission rates through plastic films, composites, and/or laminates were determined in accordance with ASTM D-3985-81.

Carbon dioxide permeabilities, i.e., carbon dioxide transmission rates through plastic films, composites, and/or laminates were determined using a MULTITRAN 800 film permeation test system, available from Modern Controls ("MOCON") Inc. (Minneapolis, Minn.). This test involves gas sample analysis employing a thermoconductivity detector, and using helium as the carrier gas. All test gases were dried via appropriate means so the test conditions were at zero percent relative humidity.

Example 1

Preparation of Barrier Polymer Composition

A 2-liter Parr pressure reactor was charged with 400 g of resorcinol diglycidyl ether (RDGE), 200 g of L-tartaric acid (Aldrich), 9 g dimethyl benzylamine, and 330 g of acetone. The vessel was purged with nitrogen for five minutes prior to being closed up. The reaction was heated to 75° C. and allowed to exotherm to 100° C. maximum. During the reaction, the pressure varied from 1293–1810 torr, with 1551 torr at 90° C. being typical. The reaction was held for 4 hours at 90° C. The reaction was cooled (water bath) until the pressure returns to atmospheric. Sixty (60) g of water and sufficient acetone to bring theoretical solids to 50 percent was added. The reaction was cooled to below 40° C. with vigorous stirring and discharged. The product obtained had the properties listed in Table 1.

TABLE 1

PROPERTIES OF GAS BARRIER POLYMER COMPOSITION

| | | |
|---|---|---|
| Solids (NV) | 50–54% | Weigh from tarred syringe, DMF flow-out, 150° C. in a forced-draft oven |
| Acid Value | <0.01 | Mmol/g 4 g + sample, DMF/water, autotitrator at 0.5 ml/min |
| Epoxide Equivalent Weight (EEW) | 2500–1667 | |
| Bubble Tube Viscosity | 360–1000 cps at 25° C. | Adjust to 50% solids with 1:1 acetone:water |
| $O_2$ Transmission Rate | 0.055 | cc-mil/day/atm/650 $cm^2$ |

Example 2

Alternative Method for Preparation of Gas Barrier Composition

To a 3 liter round bottom flask was charged 600 g of resorcinol diglycidyl ether (CVC) (RDGE), 300 g of L-tartaric acid (Aldrich), 12 g dimethyl benzyl amine, and 300 g methyl ethyl ketone (MEK). A nitrogen blanket was started and the reaction was heated to 83° C. and allowed to exotherm to a reflux temperature of 94° C. The reaction mixture was heated at reflux for 5 hours. The mixture was initially heterogeneous due to the low solubility of tartaric acid in the reaction medium. After about an hour, the reaction became clear and homogeneous. The reaction was then cooled to ambient and reduced to 50 percent solids with a 1:1 mix of acetone and methanol.

Example 3

Barcoating of Gas Barrier Polymer Composition

The gas barrier polymer formulations prepared according to Example 1 were then tested for barrier properties by reducing to 30–40 percent solids with a 90–10 mixture of acetone and water. A small amount of FC-430 (3M Co., 0.4 percent solids on solids) or isopropanol (9 percent on total) was added to improve wetting. In some runs, 20 percent (on total solids) of Alsibronz 06 mica (from Englehard Corp., Hartwell, Ga.) were stirred into the sample. The sample was barcoated over 0.5 mil PET film and baked for 10 minutes between 100 and 110° C. The oxygen transmission rate of the coated films were tested on an Oxtran 2-20 ML unit (Mocon) at 50 percent RH and 23° C. The $CO_2$ transmission rates were determined at MOCON (Minneapolis, Minn.) at 0 percent RH and 23° C. Test results were corrected for the barrier resistance of the PET substrate (control and normalized to a thickness of 1 mil. Test results for various bakes and wetting agents are summarized in Table 2.

TABLE 2

BARRIER RESISTANCE OF COATED FILMS

| Bake | FC-430 Level (SOS)[a] | Mica Level (wt %) | $O_2$ Transmission[b] | $CO_2$ Transmission[c] |
|---|---|---|---|---|
| N/a | Control | 0 | 3.4 | 16.8 |
| N/a | Control | 0 | 3.4 | 16.3 |
| 10 min. at 149° C. | 0.4 wt % | 0 | 0.054 | — |
| 10 min. at 149° C. | 0.4 wt % | 0 | 0.055 | — |
| 10 min. at 149° C. | 0.4 wt % | 20 wt % | 0.028 | — |
| 10 min. at 149° C. | 0.4 wt % | 20 wt % | 0.029 | — |
| 10 min. at 149° C. | 0.2 wt % | 0 | 0.050 | — |
| 10 min. at 149° C. | 0.2 wt % | 0 | 0.055 | — |
| 10 min. at 149° C. | 0.2 wt % | 20 wt % | 0.026 | — |
| 10 min. at 149° C. | 0.2 wt % | 20 wt % | 0.023 | — |
| 10 min. at 149° C. | 0.2 wt % | 20 wt % | 0.035 | — |
| 10 min. at 149° C. | 0.2 wt % | 20 wt % | 0.031 | — |
| 10 min. at 149° C. | 0.2 wt % | 20 wt % | 0.030 | — |
| 10 min. at 149° C. | 0.2 wt % | 20 wt % | 0.034 | — |
| 10 min. at 149° C. | None (IPA) | 0 | — | 0.200 |
| 10 min. at 149° C. | None (IPA) | 0 | — | 0.200 |
| 10 min. at 149° C. | None (IPA) | 20 wt % | — | 0.093 |
| 10 min. at 149° C. | None (IPA) | 20 wt % | — | 0.102 |

[a]Solids on solids. "FC-430 Level" refers to the amount of dewetting agent, FC-430, that is used on a weight basis considering only solids.
[b]cc-mil/day/650 $cm^2$/atm.
[c]cc-mil/day/650 $cm^2$/atm.

Example 4

Dipcoating of Gas Barrier Polymer Composition

A dip coat was prepared by mixing 188 g of epoxy ester resin (54.3 percent NV), 18 g Alsibronz 06 mica, 22 g methanol, 24 g water, and 46 g acetone. Preforms for 20 ounce PET soda bottles were dip coated using a Fisher-Payne dip coater using the largest spool. The preforms were air dried for an hour then baked for 25 minutes from an initial temperature of 60° C., increasing the temperature 12° C. every three minutes to a final temperature of 100° C. in a force draft oven. Average coating weight was 300 mg/bottle (4 mg/$in^2$, 0.2 mm). The preforms were blown into bottles and tested for oxygen permeation on an Oxtran 2-20 ML under normal laboratory atmospheric conditions (21 percent oxygen, ca 23° C., 50 percent RH). The average oxygen permeation rate of the coated bottles was 0.10 versus 0.30 cc-mill atm/bottle for uncoated bottles.

What is claimed is:

1. A gas barrier polymer composition, comprising: a polyester derived from
   a) diglycidyl ether; and
   b) an organic diacid containing at least one active hydrogen group;
wherein the composition is substantially free of degradation product polyesters.

2. A gas barrier polymer composition according to claim 1 having repeating units represented by the formula:

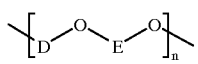

wherein D is a residue of an organic diacid ingredient containing at least one active hydrogen group, and E is the residue of a diglycidyl ether ingredient.

3. A gas barrier polymer composition according to claim 1 having repeating units represented by the formula:

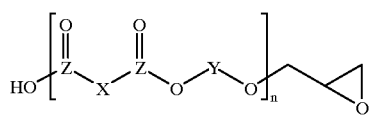

wherein X is a divalent moiety:

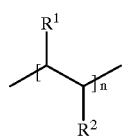

wherein n=1 to about 10 and at least one of the $R^1$ and $R^2$ groups is an active hydrogen group and the other is selected from a group consisting of hydrogen, alkyl, cycloalky, aryl, arylalkyl, alkenyl, and cycloalkenyl;
Y is an aromatic moiety:

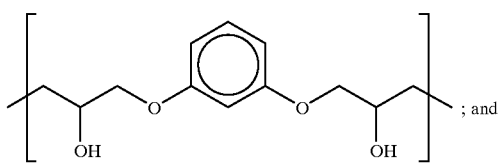; and

Z is C, P, P(O), S, S(O), Se, or Se(O).

4. A gas barrier polymer composition according to claim 3, wherein the active hydrogen group is selected from a group consisting of —OH, —SH, —$NHR^3$, wherein $R^3$ is selected from a group consisting of hydrogen, alkyl, cycloalkyl, aryl, arylalkyl, alkenyl, and cycloalkenyl.

5. A gas barrier polymer composition according to claim 1, wherein the organic diacid ingredient is selected from the group consisting of tartaric, malic, citramalic, hydroxy glutamic, and combinations thereof.

6. A gas barrier polymer composition according to claim 1, wherein the composition is essentially free of degradation product polyesters.

7. A gas barrier polymer composition according to claim 1, wherein the composition is essentially completely free of degradation product polyesters.

8. A gas barrier polymer composition according to claim 1, wherein the diglycidyl ether ingredient is selected from a group consisting of diglycidyl ethers of a phenol.

9. A gas barrier polymer composition according to claim 8, wherein phenol is selected from the group consisting of 9,9-bis(4-hydroxyphenyl)fluorene, hydroquinone, resorcinol, 4,4'-sulfonyldiphenol, 4,4'-thiodiphenol, 4,4'-oxydiphenol, 4,4'-dihydroxybenzophenone, 4,4'-biphenol, bis(4-hydroxyphenyl)-methane, 2,6-dihydroxynaphthalene, 4,4'-isopropylidene bisphenol, and combinations thereof.

10. A gas barrier polymer composition according to claim 1, wherein the polyester has a weight average molecular weight of about 2,000–80,000.

11. A gas barrier polymer composition according to claim 1, wherein the polyester does not decompose at temperatures ranging from 35° C. to 160° C.

12. A gas barrier polymer composition prepared by a process comprising the step of:
    contacting a diglycidyl ether with an organic diacid containing at least one active hydrogen group in the presence of a catalyst and a solvent;
    wherein reaction parameters of temperature, pressure, and time are regulated to minimize formation of undesirable quantities of degradation product polyesters.

13. A gas barrier polymer composition prepared by the process according to claim 12, wherein the reaction mixture is maintained at a pressure of from about 1 to about 3 atm.

14. A gas barrier polymer composition prepared by the process according to claim 12, wherein the solvent is a polar aprotic solvent and the catalyst is a tertiary amine catalyst.

15. A process for preparing a gas barrier polymer composition, comprising the steps of:
    contacting an organic diacid containing at least one active hydrogen group with a diglycidyl ether in the presence of a catalyst and a solvent; and
    regulating reaction parameters of temperature, pressure, and time to minimize formation of undesirable quantities of degradation product polyesters.

16. A gas barrier coating formulation, comprising a gas barrier polymer composition of claim 1 and a carrier.

17. A gas barrier coating formulation according to claim 16, wherein the formulation is from about 20 percent to about 70 percent solids.

18. A gas barrier coating formulation according to claim 16, wherein the formulation has a bubble tube viscosity of 0-W adjusted to 50 percent solids with 50:50 acetone:water.

19. A coating comprising the gas barrier polymer composition according to claim 1, wherein the coating has an oxygen permeability constant (OPC) of less than about 8.0 cc-mil/day/650 $cm^2$/atm.

20. The gas barrier coating according to claim 19, further comprising inorganic platelet-type filler.

21. The gas barrier coating according to claim 20, wherein the coating has an oxygen permeability constant (OPC) of less than about 5.0 cc-mil/day/650 $cm^2$/atm.

22. A coating comprising the gas barrier polymer composition according to claim 1, wherein the coating has an carbon dioxide permeability constant ($CO_2PC$) of less than about 10 cc-mil/day/650 $cm^2$/atm.

23. A method of making a multilayer packaging container having at least one layer of a gas barrier polymer coating, comprising: applying the gas barrier polymer composition according to claim 1 to a packaging container.

24. A method of making a multilayer packaging container having at least one layer of a gas barrier polymer coating, comprising: blow molding a multilayer packaging container coated with at least one layer of the polymer composition according to claim 1.

* * * * *